(12) United States Patent  (10) Patent No.: US 8,981,920 B2
Kim  (45) Date of Patent: Mar. 17, 2015

(54) TIRE PRESSURE MONITORING APPARATUS AND METHOD

(71) Applicant: Hyundai Mobis Co., Ltd., Seoul (KR)

(72) Inventor: Jae Kwon Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 18 days.

(21) Appl. No.: 13/853,147

(22) Filed: Mar. 29, 2013

(65) Prior Publication Data

US 2014/0055255 A1 Feb. 27, 2014

(30) Foreign Application Priority Data

Aug. 21, 2012 (KR) ........................ 10-2012-0091283

(51) Int. Cl.
*B60C 23/00* (2006.01)
*B60C 23/04* (2006.01)

(52) U.S. Cl.
CPC ......... *B60C 23/0489* (2013.01); *B60C 23/0416* (2013.01); *B60C 23/0488* (2013.01)
USPC ..................... 340/442; 340/686.1; 340/426.23

(58) Field of Classification Search
USPC ........... 340/442, 441, 443–447, 686.1, 572.1, 340/436, 439, 426.33, 426.31, 426.23
See application file for complete search history.

(56) References Cited

U.S. PATENT DOCUMENTS

| 4,423,632 | A | * | 1/1984 | Madden et al. ................. 73/462 |
| 5,831,429 | A | * | 11/1998 | Germanetti ................... 324/161 |
| 6,496,750 | B1 | * | 12/2002 | Yoon et al. .................... 700/186 |
| 6,815,944 | B2 | * | 11/2004 | Vig et al. ...................... 324/179 |
| 6,884,991 | B2 | * | 4/2005 | Durocher ................. 250/231.13 |
| 2006/0012469 | A1 | * | 1/2006 | Hirai .............................. 340/445 |
| 2011/0071737 | A1 | * | 3/2011 | Greer et al. ..................... 701/49 |

FOREIGN PATENT DOCUMENTS

| DE | 199 21 413 C1 | 11/2000 |
| DE | 196 18 659 B4 | 10/2004 |
| DE | 10 2009 059 788 A1 | 6/2011 |
| DE | 10 2010 037 512 A1 | 3/2012 |
| EP | 2 450 202 A1 | 5/2012 |
| KR | 10-1998-0008620 A | 4/1998 |
| KR | 10-2006-0130654 A | 12/2006 |
| KR | 10-2012-0010712 A | 2/2012 |
| KR | 10-2012-0038231 A | 4/2012 |

* cited by examiner

*Primary Examiner* — Daniel Previl
(74) *Attorney, Agent, or Firm* — NSIP Law

(57) ABSTRACT

Provided are an apparatus and method for monitoring tire pressure, and in particular, a method of identifying a position of a TPM sensor attached to a tire using tooth data of ABS. The apparatus identifies the position of the TPM sensor using a point where tooth data of ABS has a variation different for each wheel, by estimating wheel tooth data from wheel position angle information measured by a rotation sensor of the TPM sensor, comparing the actual measured value with the estimated value, and recognizing that the TPM sensor is attached to a tire where the actual measured value is the same as or closest to the estimated value.

14 Claims, 7 Drawing Sheets

FIG. 6

| Wheel Position | No. of Times | 1 | 2 | 3 | 4 | 5 | 6 | 7 | 8 |
|---|---|---|---|---|---|---|---|---|---|
| Wheel 1 | Measured | 3 | 7 | | | | | | |
| | Calculated | – | 7 | | | | | | |
| Wheel 2 | Measured | 5 | 2 | | | | | | |
| | Calculated | – | 1 | | | | | | |
| Wheel 3 | Measured | 3 | 5 | | | | | | |
| | Calculated | – | 7 | | | | | | |
| Wheel 4 | Measured | 7 | 6 | | | | | | |
| | Calculated | – | 3 | | | | | | |

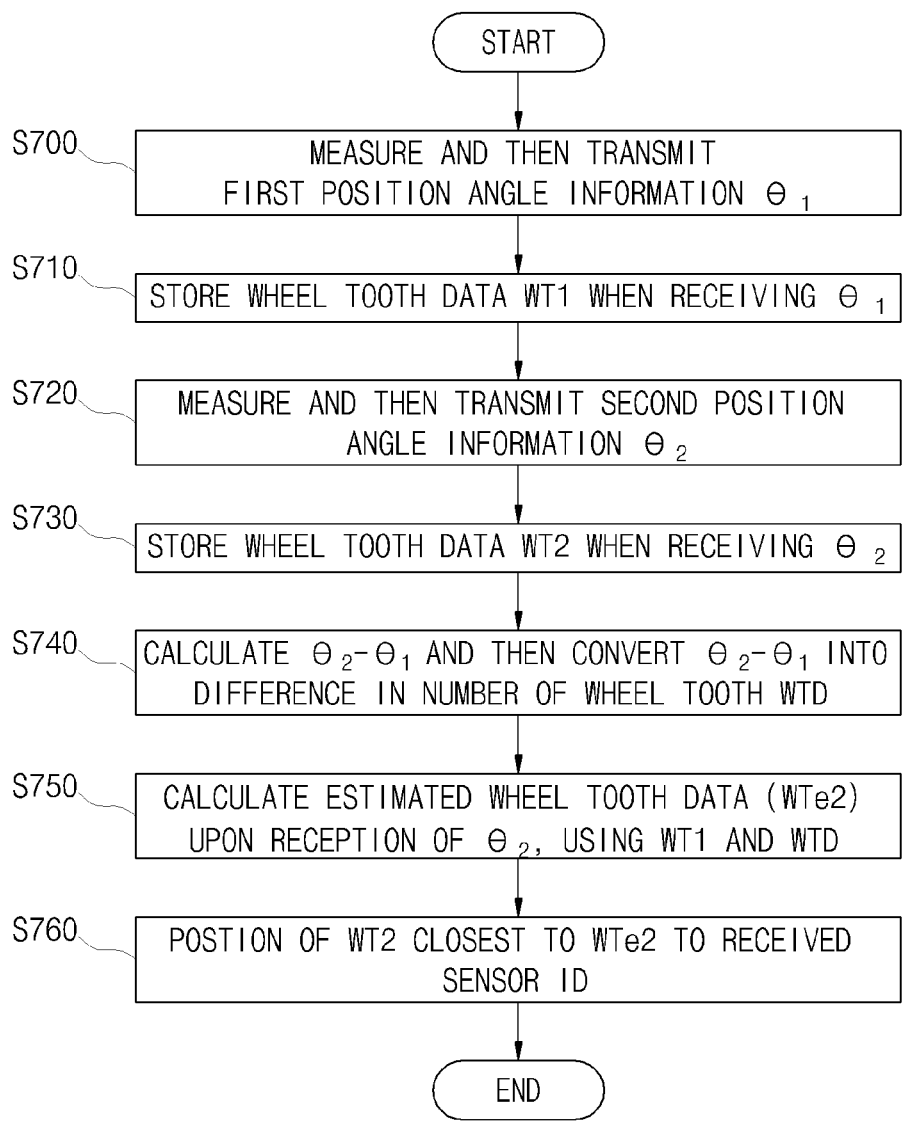

TIRE PRESSURE MONITORING APPARATUS AND METHOD

CROSS-REFERENCE TO RELATED APPLICATIONS

This application claims priority under 35 U.S.C. §119 to Korean Patent Application No. 10-2012-0091283, filed on Aug. 21, 2012, the disclosure of which is incorporated herein by reference in its entirety.

TECHNICAL FIELD

The present disclosure relates to a tire pressure monitoring apparatus and method for measuring tire pressure to provide information about the tire pressure or give a warning about low tire pressure to a driver, and in particular, to a tire pressure monitoring apparatus and method for checking a tire having an attached TPM sensor, which is used to measure the tire pressure, to identify a position of the TPM sensor.

BACKGROUND

Tire pressure monitoring system (TPMS) is used to sense tire pressure to maintain the pressure constant. TPMS includes a TPM sensor attached inside a tire to transmit a sensed value and a unique ID of the sensor over RF, and an ECU attached to a vehicle to receive RF data and information about the vehicle transmitted from the TPM sensor, determine a state of each tire and a state of a receiver, and then transmit display information to a display device such that the driver may perceive the information.

TPMS may fall into a high end system and a low end system, depending on methods of displaying the information to the driver. The high end system is a system having a function of displaying each tire pressure or displaying a position of a low pressure tire to a driver. The low end system is a system having a function of displaying only a warning about low pressure to a driver when at least one of tires attached to a vehicle has low pressure.

To implement the high end system, the TPM sensor attached to each tire should transmit information about a position of a TPM sensor, and the ECU should determine a position of the attached sensor using available information.

Among methods of identifying a position of a TPM sensor in a related art TPMS, there is a method of repeating following processes to perform an auto-location function when each TPM sensor attached to a wheel transmits data to an ECU receiver during vehicle drive.

A rotation sensor (piezoelectric material) in a TPM sensor is turned on during a predetermined time to generate a rotation information signal. The TPM sensor determines a transmission position using the rotation information signal of the rotation sensor and then transmits data (ID, temperature, pressure, etc.).

When the ECU has twice received a signal transmitted from one TPM sensor, the ECU carries out an operation of an anti-lock brake system (ABS) tooth information during time interval between a first received signal and a second received signal and determines that the TPM sensor is located at a position of a wheel where the number of rotations can be divided by a real number value.

As another related art, there is a method of repeating following processes to perform an auto-location function when each TPM sensor attached to a wheel transmits data to an ECU receiver during vehicle drive.

The rotation sensor in the TPM sensor always maintains an ON state while the auto-location function is performed. The TPM sensor determines a transmission reference position using the rotation information signal of the rotation sensor and then transmits data (ID, temperature, pressure, delay, etc.) after a predetermined delay.

The ECU carries out an operation about a current position of each wheel using the number of changes in teeth with respect to wheel rotation, which is provided by ABS, stores information about teeth of each wheel during a predetermined delay, and updates information about current positions of the teeth of each wheel while the auto-location function is performed.

The ECU receives the data of the TPM sensor and then stores ABS wheel teeth information data corresponding to a wheel position value before the delay, using delay information in TPM sensor data. Moreover, the ECU carries out an operation about ABS tooth information of each wheel, which is stored in the ID of each TPM sensor, to determine that the TPM sensor is located in a wheel having a smallest standard deviation.

However, the related art has a problem in that the number of errors increases according to an increase in a speed because the rotation sensor in the TPM sensor finds the same position angle as that of a previously transmitted wheel and thus an error occurs depending on a vehicle speed. Moreover, the related art also has a problem in that an additional memory capacitor is needed to store wheel tooth information during the delay time because there is a delay time until the rotation sensor in the TPM sensor measures wheel position angle information and the ECU receives the wheel position angle data.

SUMMARY

Accordingly, the present disclosure provides the tire monitoring apparatus and method for identifying the tire having an attached TPM sensor, by the TPM sensor measuring and transmitting wheel position angle information in a random position of the wheel and the ECU calculating and comparing wheel tooth data with the wheel position angle data.

In one general aspect, an apparatus for monitoring tire pressure includes: a rotation sensor measuring position angle information of a tire of a vehicle; a TPM sensor having the rotation sensor and attached to the tire to transmit ID information and the position angle information of the tire measured by the rotation sensor; a wheel tooth counter sensor sensing wheel tooth counter and transmitting wheel tooth data; and an ECU receiving the position angle information of the tire from the TPM sensor, receiving the wheel tooth data from the wheel tooth counter sensor, and comparing the position angle information with the wheel tooth data to allocate an ID of the TPM sensor to the tire.

The ECU may convert the difference between the first position angle information and the second position angle information into a difference in the number of wheel teeth, estimates the wheel tooth data upon reception of the second position angle information using the converted difference in the number of wheel teeth and the wheel tooth data upon reception of the first position angle information, and allocates the ID of the TPM sensor to a tire where the wheel tooth data received from the wheel tooth counter sensor is the same as the estimated wheel tooth data.

In another general aspect, a tire pressure monitoring method includes: measuring rotation angle information at a random position of the tire; transmitting the measured rotation angle information and an ID of a TPM sensor; receiving the rotation angle information, storing first wheel tooth data when receiving first rotation angle information, and storing second wheel tooth data when receiving second rotation angle; calculating a difference between the first rotation angle information and the second rotation angle information; converting the difference in the rotation angle information into a difference in the number of wheel teeth; estimating second wheel tooth data using the converted difference in the number of wheel teeth and the first wheel tooth data; comparing the estimated second wheel tooth data with the stored second wheel tooth data; and allocating the ID of the TPM sensor to a tire where the estimated second wheel tooth data is the same as the stored second wheel tooth data.

Other features and aspects will be apparent from the following detailed description, the drawings, and the claims.

BRIEF DESCRIPTION OF THE DRAWINGS

FIGS. 2 to 6 illustrate a process where a tire pressure monitoring apparatus according to an exemplary embodiment identifies a position of a TPM sensor.

FIG. 7 is a flowchart illustrating a tire pressure monitoring method according to another exemplary embodiment.

DETAILED DESCRIPTION OF EMBODIMENTS

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

In the following description, the technical terms are used only for explaining a specific exemplary embodiment while not limiting the inventive concept. The terms of a singular form may include plural forms unless specifically mentioned. The meaning of "comprises" and/or "comprising" specifies an element, a step, a process, and/or a component but does not exclude other elements, steps, processes, and/or components.

The present invention relates to an apparatus and method for identifying a position of a TPM sensor attached to a tire, using wheel tooth data of ABS, and is based on where an amount of change in tooth data of each wheel varies depending on differences such as abrasion, pressure, etc. of a tire. The present invention estimates wheel tooth data from position angle information measured during tire rotation by the rotation sensor in the TPM sensor attached to the tire, and compares the measured value with the estimated value to identify the tire where the TPM sensor is attached.

Embodiments of the present invention will be described below in more detail with reference to the accompanying drawings.

Figure 1:
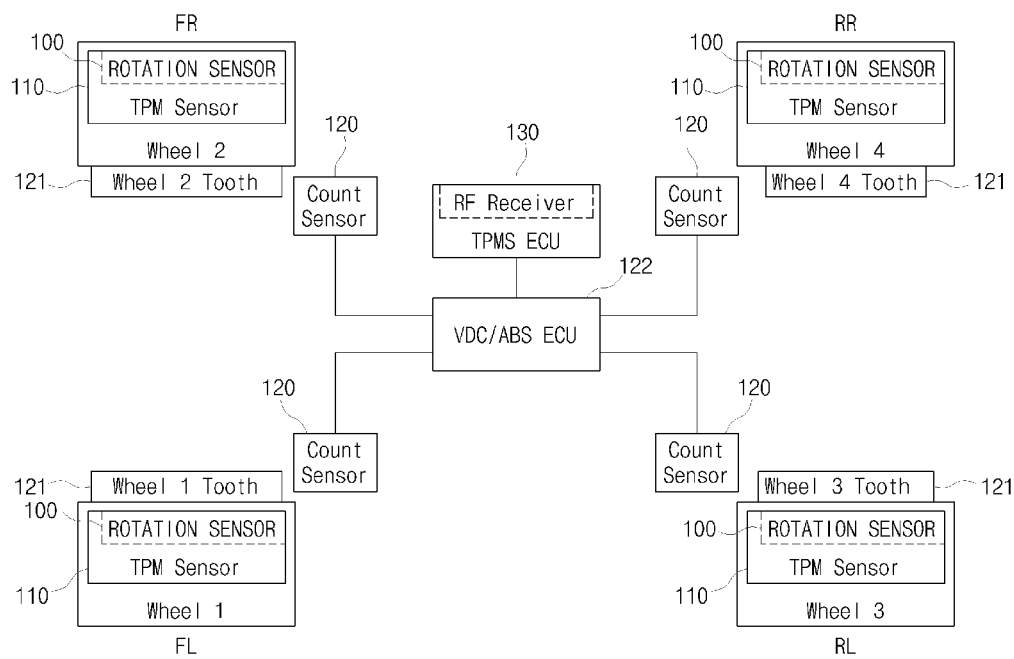
FIG. 1 is a block diagram illustrating a structure of a tire pressure monitoring apparatus according to an exemplary embodiment.

FIG. 1 illustrates a structure of a tire pressure monitoring apparatus according to an embodiment of the present invention.

The tire pressure monitoring apparatus according to an embodiment of the present invention includes a rotation sensor 100, a TPM sensor 110, a wheel tooth counter sensor 120, and a TPMS ECU 130.

The rotation sensor 100 is located in a tire to measure wheel position angle information when the tire is rotated. In the tire pressure monitoring apparatus according to an embodiment of the present invention, the rotation sensor 100 measures first position angle information at a random position after a wheel starts rotating and measures second position angle information after a certain time elapses.

The position angle information measured by the rotation sensor 100 is transmitted to the TPMS ECU 130 through the TPM sensor 110.

The TPM sensor 110 is a sensor for monitoring tire pressure. The TPM sensor 110 may include the rotation sensor 100, and transmits wheel position angle information measured by the rotation sensor 100, in addition to ID information of the TPM sensor 110, to the TPMS ECU 130.

The wheel tooth counter sensor 120 counts teeth 121 of each wheel and transmits wheel tooth data to the ABS ECU 122.

The TPMS ECU 130 receives the wheel position angle information sensed by the rotation sensor 100, through the TPM sensor 110. When the TPMS ECU 130 receives the wheel position angle information, the TPMS ECU 130 receives the wheel tooth data sensed and transmitted by the wheel tooth counter sensor 120 and stores the wheel tooth data.

The TPMS ECU 130 estimates the wheel tooth data from the wheel position angle information received from the TPM sensor 110 and compares the estimated wheel tooth data with the wheel tooth data received from the ABS ECU 122. The TPMS ECU 130 allocates the ID of the TPM sensor 110 transmitting position angle information to a tire wheel where actual data is the same as or closest to estimated data, and thus identifies a position of the TMP sensor 110.

FIGS. 2 to 6 illustrate a process where the TPMS ECU 130 identifies the position of the TPM sensor 110.

Figure 2:
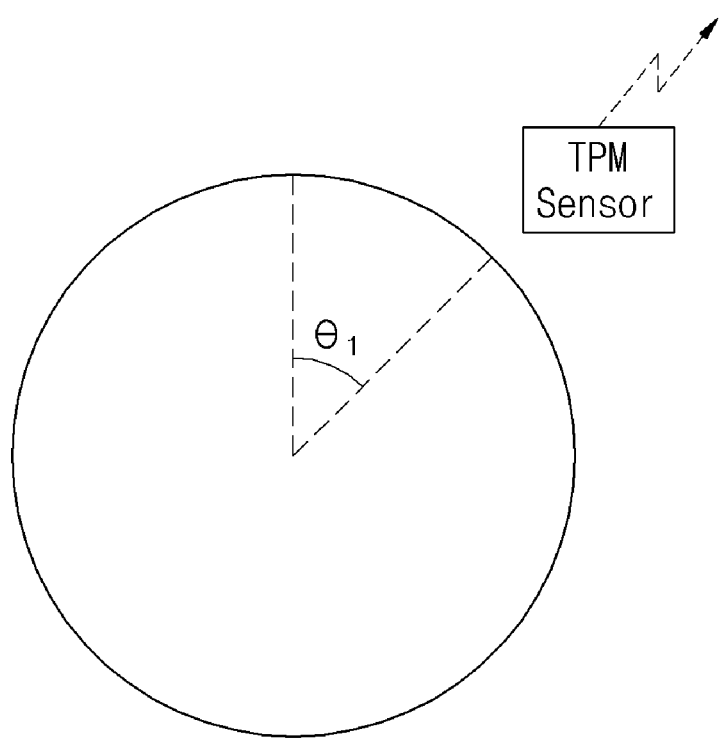
Figure 3:
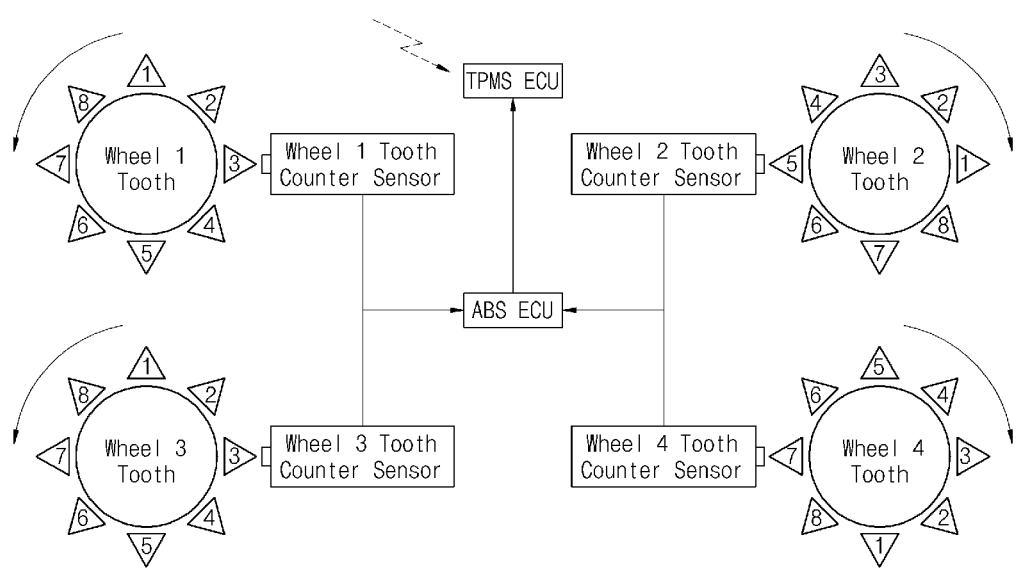

FIG. 2 illustrates that the TPM sensor 110 transmits the first position angle information and the ID of the TPM sensor 110. FIG. 3 illustrates storing the wheel tooth data when receiving the first position angle information.

The rotation sensor 100 in the TPM sensor 110 measures first position angle information $\theta_1$ at a random position after the wheel starts rotating, and the TPM sensor 110 transmits the measured first position angle information $\theta_1$ and ID information of the TPM sensor 110 to the TPMS ECU 130. When the TPMS ECU 130 receives the first position angle information $\theta_1$ transmitted from the TPM sensor 110, the TPMS ECU 130 receives and stores the wheel tooth data WT1 from the ABS ECU 122.

As illustrated in FIGS. 2 and 3, the first position angle information $\theta_1$ is 45 degrees, and when the first position angle information $\theta_1$ is received, tooth data of a first wheel is 3, tooth data of a second wheel is 5, tooth data of a third wheel is 3, and tooth data of a fourth wheel is 7.

Figure 4:
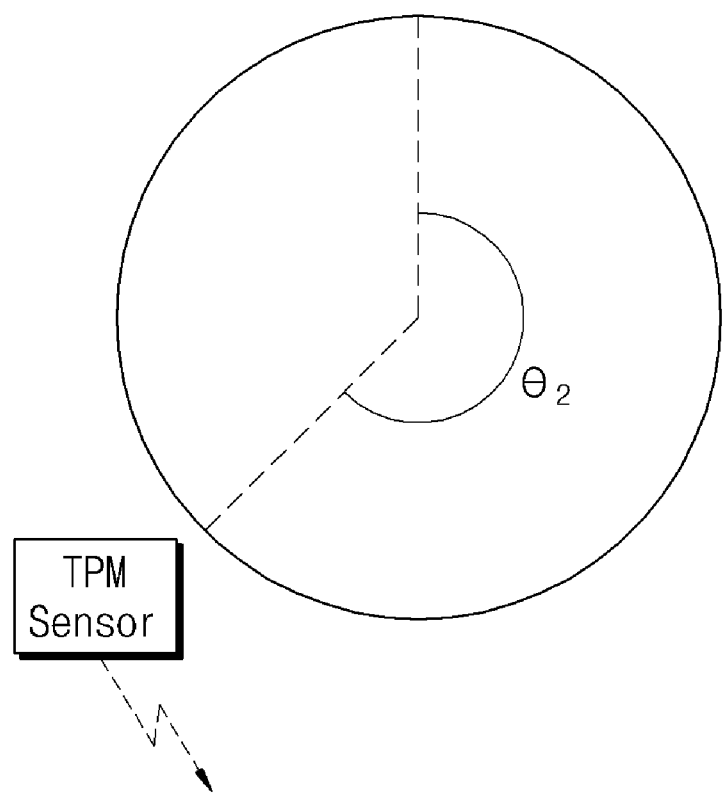
Figure 5:
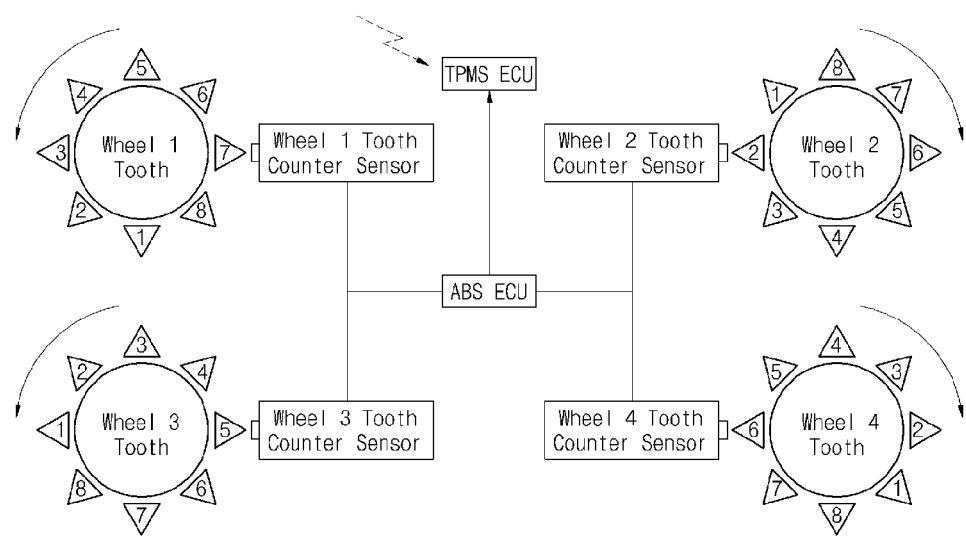

FIG. 4 illustrates that the TPM sensor 110 measures and transmits the second position angle information. FIG. 5 illustrates storing the wheel tooth data when receiving the second position angle information.

The TPM sensor 110 measures and transmits second position angle information $\theta_2$ after a certain time elapses from the transmission of the first position angle information $\theta_1$. The TPMS ECU 130 receives and stores the wheel tooth data WT2 from the ABS ECU 122 when receiving the second position angle information $\theta_2$.

As illustrated in FIGS. 4 and 5, the second position angle information $\theta_2$ is 225 degrees, and when the second position angle information $\theta_2$ is received, tooth data of a first wheel is 7, tooth data of a second wheel is 2, tooth data of a third wheel is 5, and tooth data of a fourth wheel is 6.

The TPM ECU 130 measures the wheel tooth data upon reception of the second position angle information $\theta_2$, using the first position angle information $\theta_1$ and the second position angle information $\theta_2$. In this case, the estimated wheel tooth data is referred to as WTe2.

The TPMS ECU 130 calculates $\theta_2-\theta_1$ and converts difference in position angle information into the number of wheel teeth in order to estimate WTe2. One angle of each of wheel teeth is 360 degrees/8=45 degrees, and $\theta_2-\theta_1$=225 degrees–45 degrees=180 degrees. It can be seen that the number of wheel teeth is 180/45=4.

Accordingly, the wheel tooth data WTe2 may be estimated when receiving the second position angle information, using wheel tooth data WT1 and the number of the wheel teeth when receiving the first position angle information.

For example, the difference in the number of wheel teeth between the first position angle information and the second position angle information is estimated to be 4. WTe2 may be estimated to be 3+4=7 when WT1 of the first wheel is 3. WTe2 may be estimated to be 5+4=9 when WT1 of the second wheel is 5. However, since the number of wheel teeth is 8, WTe2 is estimated to be 1.

WTe2 is estimated to be 3+4=7 when WT1 of the third wheel is 3. WTe2 is estimated to be 7+4−8=3 when WT1 of the fourth wheel is 7.

The TPMS ECU 130 compares the stored wheel tooth data WT2 with wheel tooth data WTe2 when receiving the second position angle information estimated through above processes to identify a wheel where the TPM sensor 110 is located.

FIG. 6 is a table where above-described processes are summarized, in which estimated wheel tooth data is compared with measured wheel tooth data received and stored from the ABS ECU 122. In FIG. 6, when the estimated value is the same as the measured value, the TPM sensor 110 may be determined to be located in the first wheel. Accordingly, the TPMS ECU 130 allocates an ID of the TPM sensor 110 to the first wheel.

FIG. 7 is a flowchart illustrating a tire pressure monitoring method according to an embodiment of the present invention.

When the wheel starts rotating, the rotation sensor in the TPM sensor attached to the tire measures the position angle information at a random position. When the rotation sensor measures the first position angle information $\theta_1$, the TPM sensor transmits the first position angle information $\theta_1$ and the ID of the TPM sensor to the TPMS ECU (S700).

When the TPMS ECU receives the wheel position angle information, the TPMS ECU 130 receives the wheel tooth data from the ABS ECU and stores the wheel tooth data WT1 (S710).

When the rotation sensor measures and transmits the second position angle information $\theta_2$ after a certain time (S720), the TPMS ECU stores the wheel tooth data WT2 when receiving the second position angle information $\theta_2$ (S730).

The TPMS ECU calculates $\theta_2-\theta_1$ and then converts $\theta_2-\theta_1$ into the difference in the number of wheel teeth WTD (S740). The TPMS ECU calculates the estimated value WTe2 of the wheel tooth data WT2 upon reception of the second position angle information, using converted WTD and stored WT1 (S750).

The TPMS ECU compares the estimated value WTe2 with the measured value to determine that the TPM sensor is attached to the wheel of the tire where the values are the same as or closest to each other, and allocates an ID of the TPM sensor to the tire to identify a position of the TPM sensor (S760).

The present invention provides a tire monitoring apparatus and method for measuring position angle information in a random position of a wheel and estimating wheel tooth data from the position angle information to identify a position of the TPM sensor.

The above-disclosed subject matter is to be considered illustrative, and not restrictive, and the appended claims are intended to cover all such modifications, enhancements, and other embodiments, which fall within the true spirit and scope of the present invention. Accordingly, embodiments of the present invention are intended not to limit, but to explain the technical spirit of the present invention. The scope of the present invention is not limited by these embodiments. The scope of the invention should be construed in accordance with the following claims, and all technical ideas should be construed as covering all the modifications, equivalents, and replacements within the scope of the present invention.

What is claimed is:

1. An apparatus for monitoring tire pressure, comprising:
   a rotation sensor measuring position angle information of a tire of a vehicle;
   a tire pressure monitoring (TPM) sensor including the rotation sensor and attached to the tire to transmit ID information and the position angle information of the tire measured by the rotation sensor;
   a wheel tooth counter sensor sensing wheel tooth counter and transmitting wheel tooth data; and
   an electronic control unit (ECU) receiving the position angle information of the tire from the TPM sensor, receiving the wheel tooth data from the wheel tooth counter sensor, and comparing the position angle information with the wheel tooth data to allocate an ID of the TPM sensor to the tire, wherein the ECU receives first position angle information and second position angle information from the TPM sensor, estimates wheel tooth data upon reception of the second position angle information from a difference between the first position angle information and the second position angle information, and allocates the ID of the TPM sensor to a tire where the wheel tooth data received from the wheel tooth counter sensor is the same as the estimated wheel tooth data.

2. The apparatus of claim 1, wherein the ECU converts the difference between the first position angle information and the second position angle information into a difference in the number of wheel teeth and estimates the wheel tooth data upon reception of the second position angle information using the converted difference in the number of wheel teeth and the wheel tooth data upon reception of the first position angle information.

3. The apparatus of claim 1, wherein the ECU receives and stores the wheel tooth data upon reception of the position angle information of the tire.

4. The apparatus of claim 1, wherein the ECU receives and compares a plurality of the wheel tooth data and position angle information of the tire to allocated the ID of the TPM sensor to the tire.

5. The apparatus of claim 1, wherein the ECU estimates the wheel tooth data from a plurality of position angle information and compares the estimated wheel tooth data with the received wheel tooth data to determine a tire where the IF of the TPM sensor is allocated.

6. The apparatus of claim 1, wherein the rotation sensor operates to measure the position angle information of the tire at a random position when the wheel of the tire starts rotating.

7. The apparatus of claim 1, wherein the rotation sensor operates at a predetermined interval to measure the position angle information of the tire when the wheel of the tire starts rotating.

8. The apparatus of claim 1, wherein the ECU allocates the ID of the TPM sensor according to a table comparing measured values of wheel tooth data and calculated values of wheel tooth data.

9. A method of monitoring tire pressure, the method comprising:
  transmitting rotation angle information of a tire and an ID of a TPM sensor;
  storing wheel tooth data of the tire upon reception of the rotation angle information;
  estimating wheel tooth data of the tire from the rotation angle information;
  comparing the estimated wheel tooth data with the stored wheel tooth data wherein the comparing the estimated wheel tooth data with the stored wheel tooth data is made according to a table of stored values of wheel tooth data and estimated values of wheel tooth data; and
  allocating the ID of the TPM sensor to a tire where the estimated wheel tooth data is the same as the stored wheel tooth data.

10. The method of claim 9, wherein the transmitting of the rotation angle information of the tire and the ID of the TPM sensor comprises:
  measuring the rotation angle information at a random position when the tire rotates; and
  transmitting the measured rotation angle information and the ID of the TPM sensor.

11. The method of claim 9, wherein the storing of the wheel tooth data comprises:
  storing first wheel tooth data when receiving first rotation angle information; and
  storing second wheel tooth data when receiving second rotation angle information.

12. The method of claim 11, wherein the estimating of the wheel tooth data comprises:
  calculating a difference between the first position angle information and the second angle information;
  converting the difference in the position angle information into a difference in the number of wheel teeth; and
  estimating second wheel tooth data using the converted difference in the number of wheel teeth and the first wheel tooth data.

13. The method of claim 12, wherein the comparing of the wheel tooth data comprises comparing the stored second wheel tooth data with the estimated second wheel tooth data.

14. The method of claim 13, wherein the allocating of the ID of the TPM sensor to the tire comprises allocating the ID of the TPM sensor to a tire where the stored second wheel tooth data is the same as the estimated second wheel tooth data.

* * * * *